United States Patent

[11] 3,581,439

| | | | |
|---|---|---|---|
| [72] | Inventors | Elmer W. Jensen, Jr.<br>Mount Veron, N.Y.;<br>Hans R. Jacobsen, Norwalk, Conn. | |
| [21] | Appl. No. | 718,938 | |
| [22] | Filed | Apr. 4, 1968 | |
| [45] | Patented | June 1, 1971 | |
| [73] | Assignee | Geoscience Instruments Corporation<br>Mount Vernon, N.Y.<br>Continuation-in-part of application Ser. No.<br>562,757, July 5, 1966, now Patent No.<br>3,504,457. | |

[54] BUFF APPARATUS AND METHOD OF MANUFACTURING BUFFS
5 Claims, 1 Drawing Fig.

[52] U.S. Cl. .................................................. 51/2,
51/358, 51/401, 51/328

[51] Int. Cl. ...................................................... B24b 1/00,
B24b 7/00, B24b 9/00

[50] Field of Search ......................................... 51/2, 293,
297, 358, 376—378, 401; 15/230, 230.12, 230.15,
321

[56] References Cited
UNITED STATES PATENTS
3,137,107   6/1964   Buteux ........................   15/230.12

*Primary Examiner*—Othell M. Simpson
*Attorney*—Stephen B. Judlowe

ABSTRACT: An improved buff apparatus includes a stacked array of laminated poromeric sheets. The sheets are interlocked by directing wave energy in a direction transverse to the sheets to create and interface between contiguous layers characterized by plural localized fused areas.

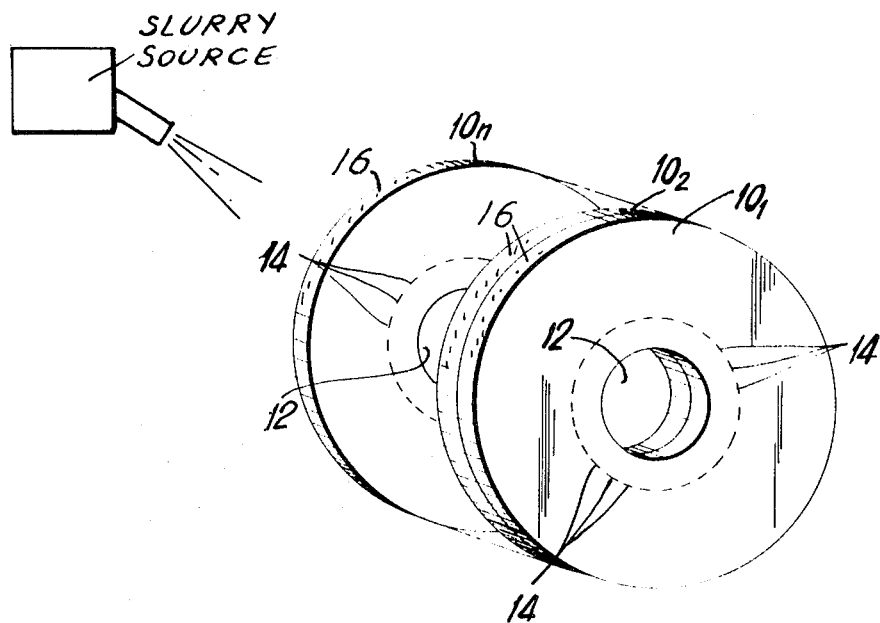

BUFF APPARATUS AND METHOD OF MANUFACTURING BUFFS

DISCLOSURE OF INVENTION

This invention relates to buff technology and, more specifically, to laminated buff apparatus and to the method for fabricating such buffs. This application is a continuation-in-part of our copending joint application Ser. No. 562,757, filed July 5, 1966 now U.S. Pat. No. 3,504,457.

Prior art buff arrangements typically include a plurality of laminated abrasive sheets each comprising, for example, felt, or cotton impregnated with various abrading compositions. The several laminations are fastened together by sewing, gluing, stapling, or the like.

However, the materials conventionally used for buff applications are characterized by at least several of the following deficiencies: (1) temperature sensitivity, and therefore instability at high buffing rates; (2) nonhomogeneous consistency; (3) a propensity to pick up and retain foreign elements; (4) poor wear characteristics requiring frequent replacement; (5) variations from sample to sample; (6) the characteristic of being impermeable, thereby preventing a polishing slurry from reaching all surface areas of a workpiece being operated upon; and (7) relatively little tensile and compressive strength, thereby being subject to distortion.

Moreover, the preparation of prior art buffs has been less than completely satisfactory. For example, it is relatively tedious and time consuming to mechanically bind the several laminated layers together by employing foreign matter, e.g., sewing the several layers together with thread; adhering the layers together by introducing an adhesive therebetween; introducing staples through the layers; or the like. Moreover, the binding thread, adhesive or other matter may wear during the buffing operation, or be chemically and/or mechanically attached by various slurries, thus causing the several buff layers to come apart. Still further, metallic staples or the like may scratch the workpiece, or tear through the buff layers.

It is therefore an object of the present invention to provide improved buffing apparatus, and an improved method for fabricating such apparatus.

More specifically, an object of the present invention is the provision of a resilient, homogeneous buffing arrangement which is porous, relatively insensitive to temperature, and which may be fabricated with little variation from sample to sample.

It is another object of the present invention to provide an improved method for fabricating laminated buffs which may advantageously be readily effected, and which does not require the mechanical introduction of foreign matter for adhesion purposes.

A complete understanding of the present invention, and of the above and other objects, features and advantages thereof, may be gained from a consideration of an illustrative buff apparatus discussed hereinbelow and depicted in the drawing, and from a consideration of an illustrative method of making such buffs.

Buff apparatus embodying the principles of the present invention is formed of several layers of Corfam (a trademark of the Du Pont Corporation for a poromeric material, i.e., a microporous and permeable coriaceous nonwoven sheet comprising a urethane polymer reinforced with polyester). Alternatively, other poromeric materials may be employed. Each layer, or sheet of Corfam is toroidal in shape, having a circular outer periphery which is the active buffing surface and a central aperture of any geometry through which a mechanically driven, buff rotating arm is inserted. The number and thickness of the Corfam sheets employed in a buff depends upon the end use application therefor.

To interlock the several Corfam layers together to form the composite buff, the layers are stacked one upon the other. The stacked array is placed between the active heads of an ultrasonic power device which generates ultrasonic waves of significant energy. Such devices are well known in the art and are available, for example, from Branson Sonic Division, Danbury, Connecticut.

The ultrasonic waves pass in a transverse direction through the stacked Corfam sheets. The Corfam sheets offer relatively little resistance to the translating waves. Conversely, there is a relatively large resistance to wave propagation in the area where such waves leave any given sheet, and enter the following sheet. Accordingly, relatively little wave energy is lost within any sheet, and most of the energy is dissipated at the interface between the contiguous sheets.

The high sonic energy loss between sheets gives rise to large temperature increases where the Corfam layers abut, and the resulting temperature is made sufficient in amplitude and duration to convert the Corfam to a plastic, nonsolid state at each localized interface. This plastic state persists as long as sonic energy is passed through the stacked layers.

When the energy source is deactivated, the Corfam cools and regains its solid state. In the area between adjacent layers, the facing Corfam material locally solidifies into one continuous mass, and thus the facing layers become bonded and interlocked in the region beneath the sonic heads. By then moving the stacked sheet array, either in any desired pattern or at random, the several buff layers will be completely interlocked into the final buff configuration.

Buff apparatus in accordance with the principles of the present invention is shown in the drawing and comprises a plurality of cascaded poromeric discs $10_1$—$10_n$ which are illustratively adhered at fixed, fused locations 14. The discs include a central orifice 12 adapted to fit over, and be secured by a work tool rotating member.

The completed buff, formed entirely of Corfam may then be usefully operated by inserting an arm through the central aperture thereof, and clamping or otherwise affixing the buff in place by any mechanical device well known to those skilled in the art. The arm is selectively rotated by a mechanical driving arrangement, for example, by an electrical or pneumatic motor.

A workpiece is brought into frictional engagement with the outer periphery of the rotating Corfam layers. The engaged surface of the workpiece may thus be cleaned, abraded, polished or the like.

The Corfam buffing sheets can withstand relatively high operating temperatures, at least in the temperature range of interest for buff operation. Accordingly, buffing can be accomplished at high rates of speed. Also the several layers are homogeneous and durable. They therefore wear slowly and evenly, and may be fabricated in relatively large quantities to produce many uniform buffing layers without material variation from element to element.

Still further, the Corfam layers are resilient and prevent damage to the workpiece otherwise produced by extraneous mechanical vibrations. Moreover, the laminated buff layers are not interlocked by foreign materials which are subject to attack by foreign chemical substances, or which can inadvertently engage and scratch the surface of the workpiece.

As a further aspect of our invention, the Corfam buff may be used in conjunction with liquid slurries containing abrading or polishing particles. The slurry may be illustratively introduced into a buffing operation by directing a spray of the slurry at the periphery of the buffing layers about the area where the workpiece is engaged. Alternatively, a slurry bath may be placed beneath the rotating buff so that each portion of the periphery of the Corfam layers will pass through the bath during each cycle of revolution. Other methods of directing the slurry to the Corfam buff will be readily apparent to those skilled in the art, for example, by utilizing capillary action through a felt material also in frictional engagement with the buff.

The Corfam layers are very porous, and hence the slurry is translated to all portions of the active buffing surface. Accordingly, buffing is uniformly effected.

As a still further aspect of our invention, the outer, active surface of the Corfam buff layers can be treated or impregnated when required for special applications. Such treatment may comprise, for example, brushing, napping, skiving, or texturing the active surface to increase the active buffing area as at 16 in the drawing, or calendaring the surface to increase its flatness.

Thus, buffs made in accordance with the above discussion provide superior performance, and may be fabricated in an improved manner.

It is to be understood that the above apparatus and method are only illustrative of the principles of the present invention. Numerous other arrangements and modes of operation may be devised by those skilled in the art without departing from the spirit and scope of this invention.

What we claim is:

1. In combination in a buff arrangement, a plurality of sheets formed of a microporous and permeable coriaceous nonwoven sheet material comprising a urethane polymer reinforced with polyester, said sheets having an annular outer periphery and disposed in a stacked array, and a plurality of locally fused areas of said poromeric material interlocking each of said sheets.

2. A combination as in claim 1 further comprising a slurry source, and means for translating slurry from said source to the periphery of said polyester-urethane sheets.

3. A combination as in claim 1 wherein the periphery of said sheets is treated to exhibit and increased surface area.

4. A method for buffing a workpiece comprising interlocking a fused stacked array of microporous and permeable coriaceous nonwoven sheets comprising a urethane polymer reinforced with polyester, said sheets being of annular outer periphery, rotating said stacked sheets, and urging said workpiece into frictional engagement with the rotating outer periphery of said sheets.

5. A method as in claim 4 further comprising directing a slurry toward the workpiece-stacked sheet peripheral interface.